(12) United States Patent
Garske et al.

(10) Patent No.: US 9,742,138 B2
(45) Date of Patent: Aug. 22, 2017

(54) BELT STRIP FOR CONTACT ELEMENTS

(71) Applicant: HARTING ELECTRIC GMBH & CO. KG, Espelkamp (DE)

(72) Inventors: Stefan Garske, Bad Essen (DE); Martin Schmidt, Luebbecke (DE); Mario Trost, Bad Pyrmont (DE); Gero Degner, Minden (DE)

(73) Assignee: HARTING ELECTRIC GMBH & CO. KG (DE)

( * ) Notice: Subject to any disclaimer, the term of this patent is extended or adjusted under 35 U.S.C. 154(b) by 0 days.

(21) Appl. No.: 15/125,109

(22) PCT Filed: Feb. 2, 2015

(86) PCT No.: PCT/DE2015/100044
§ 371 (c)(1),
(2) Date: Sep. 9, 2016

(87) PCT Pub. No.: WO2015/144126
PCT Pub. Date: Oct. 1, 2015

(65) Prior Publication Data
US 2017/0012399 A1    Jan. 12, 2017

(30) Foreign Application Priority Data

Mar. 28, 2014    (DE) .......................... 10 2014 104 406

(51) Int. Cl.
*H01R 43/16*    (2006.01)
*F16B 15/08*    (2006.01)
(Continued)

(52) U.S. Cl.
CPC ............. *H01R 43/16* (2013.01); *F16B 15/08* (2013.01); *F16B 27/00* (2013.01); *B65D 85/24* (2013.01)

(58) Field of Classification Search
CPC .......... B65D 85/24; F16B 15/08; F16B 15/00; F16B 27/00; H01R 43/16
(Continued)

(56) References Cited

U.S. PATENT DOCUMENTS

| 3,885,669 A | * | 5/1975 | Potucek | .................. F16B 27/00 206/338 |
| 4,349,106 A | * | 9/1982 | Bogel | ..................... F16B 27/00 206/347 |

(Continued)

FOREIGN PATENT DOCUMENTS

| DE | 3722953 | 1/1989 | ............. H01R 43/16 |
| DE | 19711746 | 9/1998 | ............. H01R 43/16 |

(Continued)

OTHER PUBLICATIONS

German Office Action issued in application No. 10 2014 104 406.1, dated Nov. 10, 2014 (5 pgs).
(Continued)

*Primary Examiner* — Steven A. Reynolds
(74) *Attorney, Agent, or Firm* — Hayes Soloway P.C.

(57) ABSTRACT

Provided is a belt strip for contact elements, which includes of a flat metal strip, from which individual tabs are angle by approximately 90°, wherein the tabs each have two retaining arms which are bent towards one another, wherein the retaining arms each have a constant direction of curvature, and wherein the radius of curvature is greater in the direction of the ends of the respective retaining arms.

5 Claims, 2 Drawing Sheets

(51) Int. Cl.
*F16B 27/00* (2006.01)
*B65D 85/24* (2006.01)

(58) Field of Classification Search
USPC ....... 206/338, 345, 346, 347, 340, 343, 339, 206/341
See application file for complete search history.

(56) References Cited

U.S. PATENT DOCUMENTS

| | | | | |
|---|---|---|---|---|
| 4,606,455 A | * | 8/1986 | Grikis | F16B 27/00 206/347 |
| 5,452,796 A | * | 9/1995 | Ohuchi | B21J 15/323 206/338 |
| 6,029,814 A | * | 2/2000 | Ohuchi | B21J 15/323 206/338 |
| 6,098,801 A | * | 8/2000 | McCardle | B23K 9/206 206/338 |
| 6,126,005 A | * | 10/2000 | Long, Jr. | H01R 43/00 206/390 |
| 6,896,559 B2 | * | 5/2005 | Klein | H01R 13/422 439/733.1 |
| 2003/0013330 A1 | | 1/2003 | Takeuchi | 439/83 |

FOREIGN PATENT DOCUMENTS

| | | | |
|---|---|---|---|
| EP | 0501392 | 9/1992 | ............ H01R 43/16 |
| EP | 0847112 | 6/1998 | ............ H01R 43/24 |
| WO | WO9840937 | 9/1998 | ............ H01R 43/16 |

OTHER PUBLICATIONS

International Search Report and Written Opinion (w/translation) issued in application No. PCT/DE2015/100044, dated May 18, 2015 (22 pgs).
International Preliminary Report on Patentability (translated) issued in application No. PCT/DE2015/100044, dated Oct. 13, 2016 (11 pgs).

* cited by examiner

BELT STRIP FOR CONTACT ELEMENTS

FIELD OF THE INVENTION

The invention is based on a belt strip for contact elements.

BACKGROUND OF THE INVENTION

Belt strips of this type are used to process the contact elements in an automated manner. By way of example, belt strips of this type can be used in what are known as component inserting machines. In these component inserting machines, insulating bodies of plug connectors are equipped in an automated manner with contact elements. The contact elements are conveyed via the belt strips to the appropriate processing area of the machine.

DICUSSION OF THE PRIOR ART

EP 0 501 392 A2 presents a belt strip for contact elements. The belt strip has a strip-like basic shape, from which two opposing tabs are each bent at approximately 90°. The tabs each have circular recesses, in which the contact elements are securely clamped.

In EP 0 501 392 A2 the contact elements are held in the recesses in a force-locked or frictionally engaged manner. As the contact elements are removed in an automated manner, the surface of the contact elements can be slightly abraded. This is disadvantageous in particular in the case of gold-plated contact elements. The surface coating of contact elements is becoming ever thinner due to the high raw material costs. Even the slightest abrasion of the surface can therefore lead to great losses in the current-carrying capacity of the contact element.

SUMMARY OF THE INVENTION

The problem addressed by the invention lies in proposing a belt strip for contact elements which allows the contact elements to be machine processed in a simple manner and without being damaged.

The belt proposed here is intended to hold electrical contact elements and is used in what are known as component inserting machines.

The belt consists fundamentally of a flat metal strip. Individual tabs are bent at approximately 90° from the strip-like basic shape of the metal strip.

The terms "belt" and "belt strip" will be used synonymously hereinafter.

The tabs have a recess stamped therein, with each recess forming two retaining arms curved toward one another. These retaining arms have a constant direction of curvature. This means that the retaining arms have only a positive or a negative curvature over their entire extension. Since the retaining arms are curved toward one another, each tab forms a positively and a negatively curved retaining arm. As is known, a positive curvature forms a left-handed curve and a negative curvature forms a right-handed curve, accordingly.

The radius of curvature of each of the retaining arms becomes greater toward the free ends of said arms. This means that the curvature or bend decreases toward the ends.

Two tabs are advantageously bent from the main body of the metal strip in a manner arranged opposite one another. These tabs together form a tab pair. The individual contact elements can be optimally transported in an axially aligned manner by means of such a tab pair.

The flat metal strip advantageously has a plurality of recesses arranged in succession, wherein the recesses are arranged between the tab pairs. These recesses are generally circular and serve to transport the belt in the component inserting machine.

An advantageous method will be described hereinafter, by means of which a belt, advantageously a belt of the above-described type, can be equipped with contact elements.

The contact elements are first placed between the curved retaining arms of each tab pair. This can be implemented either by inserting the contact elements from the side or by inserting them from above.

The retaining arms are then bent in further in their original bending direction by means of a punch, until the contact element is surrounded by the retaining arms in a force-free and/or friction-free manner. In this case the retaining arms encompass the contact element in the peripheral direction, without being connected to the outer surface of the contact element in a force-locked or frictionally engaged manner. The contact element, due to the force of gravity, merely rests on the retaining arms. The diameter formed by the encompassing retaining arms is slightly greater than the diameter of the contact element at the point at which the retaining arms encompass the contact elements.

BRIEF DESCRIPTION OF THE DRAWINGS

An exemplary embodiment of the invention is illustrated in the drawings and will be explained in greater detail hereinafter. In the drawings.

DETAILED DESCRIPITION OF THE INVENTION

The figures contain schematic illustrations which are partially simplified. Like reference signs are sometimes used for elements which are similar, but potentially not identical. Different views of the same elements can be scaled differently.

Figure 1:
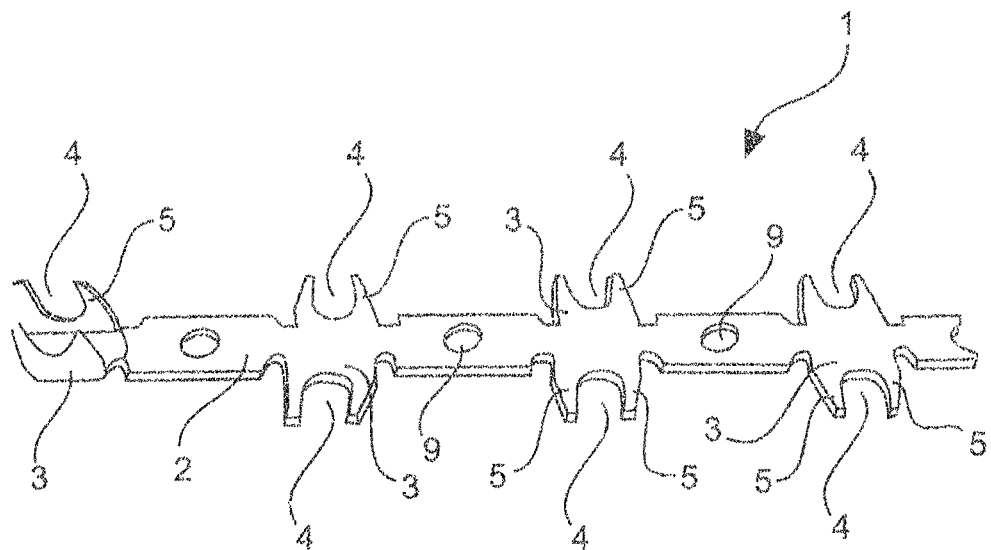
FIG. 1 shows a perspective illustration of a belt which is not yet finished.
Figure 2:
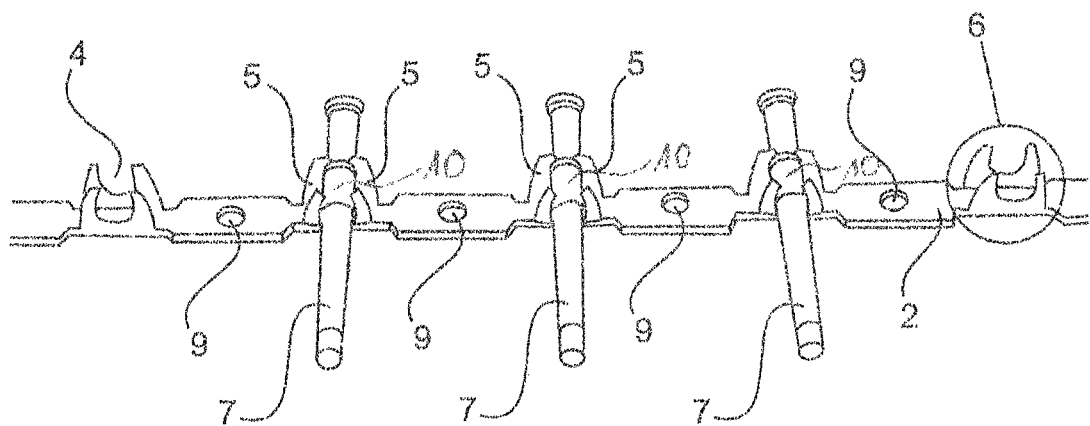
FIG. 2 shows a perspective illustration of the belt with inserted contact elements.

FIG. 1 shows a belt 1 which is not yet finished. The belt 1 consists fundamentally of a flat metal strip 2, from which individual tabs 3 protrude. An oval recess 4 is punched out from the tabs 3. Due to the punching out, two retaining arms 5 are created in each case. For reasons of clarity, only some of the retaining arms 5 have been provided with a reference sign in FIG. 1.

The tabs 3 are folded away perpendicularly (approximately by 90°) from the main body of the metal strip 2. As a result, two tabs 3 in each case extend parallel to one another and form what is known as a tab pair 6.

Contact elements 7 are inserted into the tab pair 6. This can be performed either parallel to the orientation of the retaining arms 5, i.e. from the side, or perpendicularly to the retaining arms 5, i.e. from above.

The flat metal strip 2 has a plurality of recesses 9 arranged in succession. The belt 1 can thus be driven forward in a component inserting machine.

Figure 3:
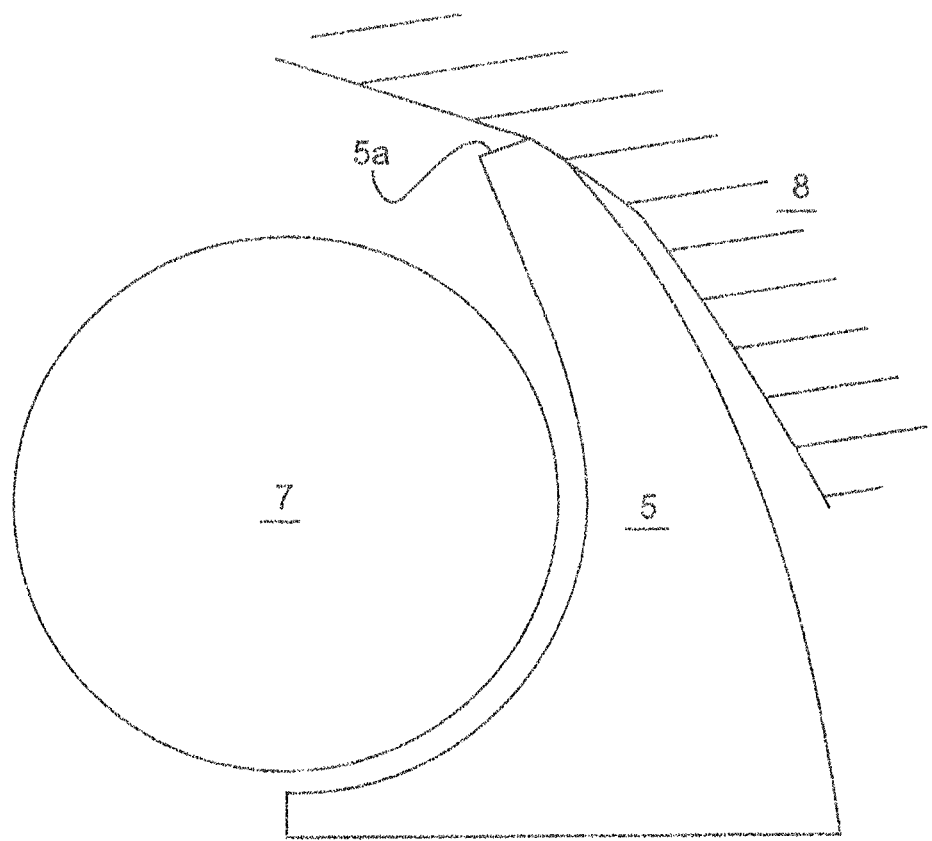
FIG. 3 shows a schematic illustration of a forming process for forming a retaining arm of the belt.

In FIG. 3 the schematic illustration of an individual retaining arm 5 can be seen. It is clearly visible that the retaining arm 5 has a constant direction of curvature. In this case the retaining arm 5 is curved to the left. The radius of curvature increases in the direction of the end 5*a* of the retaining arm 5; the bend thus becomes less prominent.

In FIG. 3 a section of a contact element 7 and of a punch 8 can be seen. The section of the contact element has an approximately circular shape. The punch presses the end 5*a* of the retaining arm 5 further in its original bending direction.

The contact element 7 has, in the upper third, a radially protruding and peripheral thickened portion 10. The end 5*a* of the retaining arm 5 is curved in the direction of the contact element 5 by the punch 8. As a result, the contact element 7 is surrounded by the retaining arms 5 in a force-free and/or friction-free manner. The contact element 7 is also surrounded rotatably by the retaining arms 5. The contact element rests on the retaining arms 5 by the radially protruding thickened portion. The contact element 7 is thus securely held and can be machine processed.

The surface coating of contact elements 7 processed in this way remains undamaged, which increases the quality of the finished plug connectors.

Belt Strip for Contact Elements

LIST OF REFERENCE SIGNS

1 belt strip
2 flat metal strip
3 tab
4 oval recess
5 retaining arm
5*a* end of the retaining arm
6 tab pair
7 contact element
8 punch
9 recess
10 thickened portion

The invention claimed is:

1. A belt strip for contact elements, said belt strip comprising a flat metal strip, from which a plurality of individual tabs extend at approximately 90°, wherein two of said tabs are arranged opposite one another and together form a tab pair, said tab pair tabs each having two retaining arms curved toward one another, and, wherein the retaining arms each have a distal end opposite a proximal end which is connected to the belt strip, and a constant direction of curvature in which a radius of said curvature increases in a direction of the distal ends of their corresponding retaining arms, whereupon a bend of the retaining arms becomes less prominent in a direction of the distal ends of the retaining arms.

2. The belt strip as claimed in claim 1, wherein the flat metal strip has a plurality of recesses arranged in succession, which recesses are arranged between the tab pairs.

3. The belt strip as claimed in claim 1, said belt strip further comprising at least one contact element.

4. The belt strip as claimed in claim 3, wherein the contact element has a radially protruding and peripheral thickened portion.

5. A method for equipping a belt strip as claimed in claim 1 with contact elements, comprising the steps of:
 (1) inserting a contact element between each of the curved retaining arms of a tab pair, and
 (2) curving the ends of the retaining arms further in their original bending direction by using a punch until the contact element is surrounded by the retaining arms in a friction-free manner.

* * * * *